United States Patent
Gutierrez et al.

(10) Patent No.: US 11,485,913 B2
(45) Date of Patent: Nov. 1, 2022

(54) MULTISTAGE PROCESS WITH HYDROTHERMAL LIQUEFACTION

(71) Applicant: UPM-KYMMENE CORPORATION, Helsinki (FI)

(72) Inventors: Andrea Gutierrez, Espoo (FI); Pekka Jokela, Espoo (FI); Roel Westerhof, Enschede (NL); Sascha Kersten, Delden (NL); Bert Heesink, Enschede (NL)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 17/350,503

(22) Filed: Jun. 17, 2021

(65) Prior Publication Data
US 2021/0403813 A1    Dec. 30, 2021

(30) Foreign Application Priority Data
Jun. 26, 2020 (FI) ...................... 20205681

(51) Int. Cl.
*C10G 1/06* (2006.01)
*C10G 1/00* (2006.01)
*C10G 1/02* (2006.01)
*C10G 3/00* (2006.01)
*C10G 51/02* (2006.01)

(52) U.S. Cl.
CPC .............. *C10G 1/06* (2013.01); *C10G 1/008* (2013.01); *C10G 1/02* (2013.01); *C10G 3/40* (2013.01); *C10G 51/023* (2013.01); *C10G 2300/1014* (2013.01); *C10G 2300/4006* (2013.01); *C10G 2300/4012* (2013.01); *C10G 2300/4081* (2013.01)

(58) Field of Classification Search
CPC .............. C10G 1/06; C10G 2300/1014; C10G 2300/4006; C10G 2300/4012
See application file for complete search history.

(56) References Cited

U.S. PATENT DOCUMENTS

| 2010/0041119 | A1* | 2/2010 | Christensen | C08H 8/00 435/162 |
|---|---|---|---|---|
| 2010/0312027 | A1* | 12/2010 | Tsurutani | C10G 3/50 585/242 |
| 2011/0209387 | A1 | 9/2011 | Humphreys | |
| 2014/0099691 | A1* | 4/2014 | Iversen | C10G 1/065 435/166 |
| 2016/0152737 | A1* | 6/2016 | Dottori | C08H 8/00 127/34 |

FOREIGN PATENT DOCUMENTS

| WO | 2011117705 A2 | 9/2011 |
| WO | 2011148046 A1 | 12/2011 |
| WO | 2017219151 A1 | 12/2017 |
| WO | 2018015608 A1 | 1/2018 |

OTHER PUBLICATIONS

Ibarra-Gonzalez, P. et al., "A review of the current state of biofuels production from lignocellulosic biomass using thermochemical conversion routes", Chinese Journal of Chemical Engineering, vol. 27, 2019; pp. 1523-1535.

* cited by examiner

*Primary Examiner* — Randy Boyer
(74) *Attorney, Agent, or Firm* — Cantor Colburn LLP

(57) ABSTRACT

The disclosure relates to a process for converting lignocellulosic feedstock (10) to renewable product (80), wherein the process comprises the following steps; treating (100) lignocellulosic feedstock (10) with aqueous solution (20) to obtain a mixture (30); heating (110) the mixture (30) of step (a) to a temperature between 290 and 340° C., under a pressure from 90 to 120 bar, to obtain a first product mix (40); separating aqueous phase (53) and oil phase (50), and optionally gas (51) and solids (52), of the first product mix (40) of step (b); and heating (130) the oil phase (50) of step (c) and solvent (60). The heating (130) is optionally followed by fractionation (200) to obtain a light fraction (90) and a heavy fraction (91) and optionally a bottom residue fraction (92) and/or a gaseous fraction.

25 Claims, 3 Drawing Sheets

# MULTISTAGE PROCESS WITH HYDROTHERMAL LIQUEFACTION

CROSS REFERENCE TO RELATED APPLICATION

This application claims benefit of Finnish Patent Application No. 20205681 filed on Jun. 26, 2020, the contents of which is incorporated by reference herein in its entirety.

FIELD OF THE DISCLOSURE

The present disclosure relates to a process for converting lignocellulose to renewable product and more particularly to treating lignocellulosic feedstock with aqueous solution to obtain a mixture, heating the mixture once to obtain a first product mix, separating one or more of gas, aqueous phase, oil phase and solids from the first product mix and heating the oil phase further to obtain a second product mix. The second product mix can be used as such, it can be directed to separation or it can be upgraded. The obtained liquid renewable product is suitable as fuel, fuel components or feedstock for fuel production.

BACKGROUND OF THE DISCLOSURE

Biomass is increasingly recognized as a valuable feedstock to be used as an alternative to petroleum for the production of biofuels and chemicals.

Renewable energy sources represent the potential fuel alternatives to overcome the global energy crises in a sustainable and eco-friendly manner. In future, biofuels may replenish the conventional non-renewable energy resources due to their renewability and several other advantages.

Biofuels are typically manufactured from feedstock originating from renewable sources, including oils and fats obtained from plants, animals, algal materials and fish. Lignocellulosic biomass, which refers to plant biomass that is composed of cellulose, hemicellulose, and lignin, offers a highly renewable biomass to generate biofuels. Biofuels originating from lignocellulosic biomass can replace fossil fuels from an energy point of view.

Converting biomass into renewable fuels and chemicals usually involves thermal treatment of the biomass and a promising technology is Hydrothermal Liquefaction (HTL). HTL is usually carried out with liquid water at temperatures between 320° C. and 400° C. To keep the water in the liquid state very high operational pressures of 200 bar or above are needed.

Despite the ongoing research and development in the processing of feedstocks and manufacture of fuels, there is still a need to provide an improved process for converting biomass, particularly lignocellulosic biomass, to valuable chemicals, such as hydrocarbons suitable as fuels or fuel blending components.

BRIEF DESCRIPTION OF THE DISCLOSURE

The invention provides methods for producing liquid renewable product(s) from lignocellulosic feedstock. The method generally involves providing multiple thermal conversion treatments at moderate temperatures and reaction pressures to produce a renewable product consisting mainly of oxygen containing hydrocarbons which can be used as such or upgraded.

The disclosure is based on the idea of using a multi-stage process comprising multiple thermal conversion steps that are all operated at moderate pressure, especially a process comprising a first stage of hydrothermal liquefaction followed by a second stage of thermal upgrading.

An advantage of the process of the disclosure is that lignocellulosic biomass feedstock is processed in a multistage process at less severe conditions. Thus, the main challenges of prior art hydrothermal liquefaction are avoided, i.e. feeding of the reaction slurry to the reactor at high pressures and temperatures, operating at high temperatures and pressures, operating near supercritical temperature and pressure of water and recovering product at high pressure. Further, special materials needed due to harsh conditions, resulting in high investment costs for HTL plants, can be avoided.

The cost-effective biomass conversion process of the disclosure allows the use of lower temperatures and milder conditions. At conditions below those of supercritical water, the salts typically used as catalysts remain in the aqueous phase, and thus precipitation and deposit of the salts can be avoided. A further advantage of the process is that no drying of the biomass is needed prior to the conversion. Also, separation of different phases after the different steps of the process is easier and more economic.

Recycling of the aqueous phase separated after the hydrothermal liquefication decreases the amount of fresh water needed and also decreases the amount of new salts needed in the process. Separating of the aqueous phase comprising all or part of the salts from the first product mix, also leads to a less corrosive environment in the second thermal conversion stage when treating the oil phase.

Recycling a light fraction, obtained after fractionation, as solvent in the thermal upgrading step increases the oil yield and helps avoiding formation of coke and undesired polymerization reactions in the thermal upgrading step. Further, the amount of oxygen in the oil products decreases. By adjusting process conditions, the oxygen content of the oil products can be altered where lower oxygen contents correspond to lower product yields. As the availability of feedstock may be limited in the future, an improved process minimizing yield loss is also of interest.

In order to reduce the consumption of external energy, heat from one or more product streams can be used to heat up feed streams.

The process of the disclosure is especially suitable for converting lignocellulosic biomass, to valuable chemicals, such as hydrocarbons and/or oxygen containing hydrocarbons suitable as fuels, fuel blending components or feedstock for fuel production.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
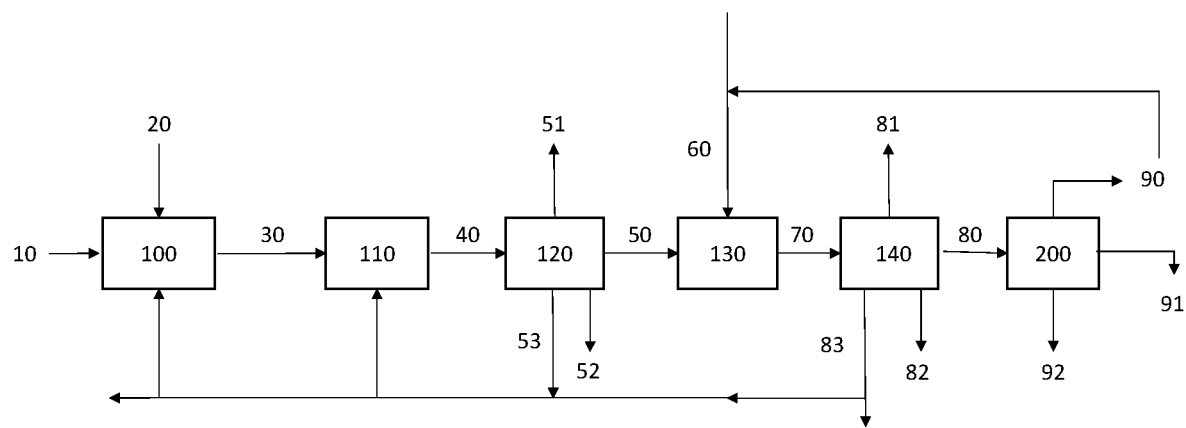
FIG. 1 is a schematic flow diagram representing one embodiment of the multistage process.

An industrially effective and sustainable process for recovering renewable products from lignocellulosic feedstock is provided, where yield loss is minimized, and the feedstock is effectively and economically converted to renewable products. The product and especially fractions thereof are particularly suitable as feedstock for hydroprocessing in biofuel manufacture.

A multi-stage process is proposed that comprises a pretreatment step and multiple thermal conversion steps that are all operated at moderate pressure to reduce investment costs.

According to an embodiment of the disclosure the first step of the process is pretreatment of a lignocellulosic feedstock with aqueous solution, preferably either water and salts such as alkaline salts, preferably chosen from sodium hydroxide (NaOH), potassium carbonate ($K_2CO_3$), potassium hydroxide (KOH) and sodium carbonate ($Na_2CO_3$), or black liquor, optionally diluted with water, at a temperature between 180° C. and 245° C., under a pressure from 10 to 55 bar, for 10-180 minutes optionally with water and/or salts of the aqueous phase obtained in the process, to obtain a pumpable mixture. The breakdown of the feedstock can be facilitated by mechanical treatment using different kind of mechanical equipment such as stirrer, pump etc. The obtained mixture is pumpable, and it is fed to a first thermal conversion step which is hydrothermal liquefaction where the mixture is heated to a temperature between 290 and 340° C., optionally together with water and/or salts of the aqueous phase obtained in the process. At this temperature the pressure increases up to between 70 and 120 bar. A first product mix is obtained and from this product mix comprising solids, aqueous phase, gas and oil phase at least aqueous phase and oil phase are separated from each other. The solids, if present and separated, are typically unconverted wood or char. Typically the separated solids form a cake comprising oil. In order to increase the oil yield, this oil is optionally separated from the solids by washing or separating by steam. The solids can also remain in the oil phase which is treated further in a second thermal conversion step by thermal upgrading. The aqueous phase is optionally recycled back to the pretreatment and/or the hydrothermal liquefaction step. If the temperature of the hydrothermal liquefaction step is increased, the amount of solids as well as the amount of organics in the aqueous phase typically decreases. The oil phase is treated further in a thermal upgrading step at 360-450° C., under a pressure from 50 to 120 bar. A second product mix, which can be used as a renewable product as such or which can be further upgraded, is recovered. The second product mix obtained from the thermal upgrading step can optionally be directed to a second separation step where one or more of gases, solids, aqueous phase and oil phase are separated. Typically, at least an oil phase is separated. If any aqueous phase is separated it is optionally recycled back to the pretreatment and/or the hydrothermal liquefaction step. In a preferred embodiment no solids are left to be separated from the second product mix. Preferably the solids, if any, have been separated after the hydrothermal liquefaction step.

According to an embodiment of the disclosure the second product mix or the renewable product, is then directed to fractionation, separating a light fraction and a heavy fraction as well as optionally gases and a bottom residue fraction. The fractionation may be for example fractional distillation utilizing at least one fractionation distillation column. Optionally part of the light fraction is upgraded by hydroprocessing and optionally part of the light fraction is used as solvent in the thermal upgrading step of the process, thus avoiding formation of coke and undesired polymerization reactions.

In the present specification and claims, the following terms have the meanings defined below.

The term "lignocellulosic feedstock" refers to lignocellulosic biomass from virgin and waste materials of plant origin that consists essentially of three natural polymers: cellulose, hemicellulose, and lignin. Lignocellulosic biomass material has an elemental composition typically rich in carbon and oxygen but relatively poor in hydrogen. Biomass comes in many different forms, which according to one definition may be grouped into four main categories: wood and wood residues, including sawmill and paper mill discards, municipal paper waste, agricultural residues, including corn stover (stalks and straw) and sugarcane bagasse, and dedicated energy crops. Examples of energy crops are for example tall, woody grasses such as switchgrass, *miscanthus* and *energycane* grass and grain or seed crops such as *Sorghum bicolor, Jatropha curcas* L. and *Arundo donax*, and seeds of the family Brassicaceae, for example *Brassica carinata* and *Camelina sativa*. The feedstock of the embodiments of the disclosure either comprises lignocellulose feedstock or consists of lignocellulosic feedstock.

The term "aqueous solution" is the solvent used in the pre-treatment of the lignocellulosic feedstock. According to the disclosure the aqueous solution used is typically either raw-material or residues originating from pulp- and paper-making, such as black liquor obtained from the pulp Kraft process or alternatively the aqueous solution is water and salts. The salts are typically chosen from one or more of NaOH, $K_2CO_3$, KOH, $Na_2CO_3$ or similar salts. When black liquor is used as the aqueous solution it can be diluted with water: The aqueous solution comprises an adjustable amount of salts.

The term "mixture" is the heterogeneous mixture obtained after the pretreatment of the lignocellulosic feedstock according to the disclosure. The mixture can be a slurry, a suspension or any other kind of pumpable mixture.

The term "black liquor" as used herein, refers to the aqueous liquid residue of the kraft pulping process which has been separated from solid wood pulp (cellulose fibres). The kraft pulping process is well-known. The process involves the conversion of wood to pulp using an aqueous mixture containing sodium hydroxide and sodium sulphide. These chemicals remove the lignin links between cellulose fibres, thereby releasing the fibres and producing water-soluble compounds. The production of black liquor is well-understood by the skilled person. Black liquor contains dissolved wood degradation products such as lignin and hemicellulose fragments, as well as methanol, sulfur compounds and dissolved inorganic solids such as spent pulping chemicals. The methanol content is typically in the range of 0.5-1.5 wt. % based on the mass of dry solids. Sulfur compounds are typically contained in the black liquor in an amount of 2-7 wt. % based on the mass of dry solids. The liquid separated from pulp and containing these compounds is commonly referred to as "crude black liquor" or "weak black liquor".

The term "crude oil" is the first oil phase obtained after separation of at least an aqueous phase and an oil phase from the first product mix obtained from the hydrothermal liquefaction step of the process. The oil phase is treated further in a thermal upgrading step. The crude oil may include all or some solids of the first product mix.

The term "crude tall oil" is one optional solvent used in the thermal upgrading step of the process. Crude tall oil (CTO) is mainly composed of both saturated and unsaturated oxygen-containing organic compounds such as unsaponifiable matter, neutral substances including sterols 15 and esters, resin acids (mainly abietic acid and its isomers), fatty acids (mainly palmitic acid, linoleic acid, oleic acid and linolenic acid), fatty alcohols, sterols and other alkyl hydrocarbon derivatives. The handling and cooking of the wood causes break down of the triglyceride structures and hence CTO does not contain any significant amounts of triglycerides. Typically, CTO contains some amounts of impurities such as inorganic sulphur compounds, metals, sodium, potassium, calcium and phosphorus. The composition of the CTO varies depending on the specific wood species.

According to the embodiments of the disclosure, the temperature of the first step, the pretreatment step is adjusted to a temperature selected from between 180° C. and 245° C., more preferably from 200° C. to 220° C., including the temperature being a temperature between two of the following temperatures; 180° C., 190° C., 200° C., 205° C., 210° C., 215° C., 220° C., 225° C., 230° C., 240° C. and 245° C. for the heating of the lignocellulosic feedstock at a pressure from 10 to 55 bar, preferably 20 bar-30 bar for 10-180 minutes, preferably 50-70 minutes. At lower temperatures such as from 180° C. to 210° C. a longer time such as from 120 to 180 minutes is preferred and at higher temperatures such as 230 to 245° C. a shorter time such as 10 to 20 minutes is sufficient. A shorter time such as 10 to 60 minutes, preferably 10 to 20 minutes is also sufficient when mechanical treatment such as stirring is used during the pretreatment step. The temperature of the hydrothermal liquefaction step is adjusted to a temperature selected from between 290° C. and 340° C., more preferably between 300° C. and 330° C., including the temperature being a temperature between two of the following temperatures; 290° C., 300° C., 305° C., 310° C., 315° C., 320° C., 325° C., 330° C. and 340° C. for the heating of the mixture of the pretreatment step at a pressure from 70 to 160 bar, preferably from 120 bar to 140 bar, including the pressure being between two of the following pressures; 70 bar, 80 bar, 90 bar, 95 bar, 100 bar, 105 bar, 110 bar, 115 bar, 120 bar, 130 bar, 140 bar, 150 bar and 160 bar. In a continuous process the pressure is preferably from 100 bar to 115 bar. In the first separation step one or more of the different elements of the first product mix, i.e. the product obtained from the hydrothermal liquefaction step, are separated. The first product mix is typically a mixture of gas, aqueous phase, oil phase and solids and typically at least an aqueous phase and an oil phase are separated. The oil phase optionally contains solids comprised in the first product mix. At the thermal upgrading step the temperature is adjusted to a temperature selected from between 360° C. and 450° C., more preferably between 360° C. and 400° C., including the temperature being a temperature between two of the following temperatures; 360° C., 370° C., 375° C., 380° C., 385° C., 390° C., 395° C., 400° C., 410° C., 420° C., 430° C., 440° C. and 450° C. for heating the oil phase obtained in the first separation step together with a solvent, typically chosen from crude tall oil, acid oil, vegetable oil, renewable hydrocarbons, oxygen containing hydrocarbons and/or mixtures thereof. Suitable vegetable oil is for example *Brassica carinata* oil and *Jatropha* oil. The renewable hydrocarbons or oxygen containing hydrocarbons preferably used as solvent can be from the process itself. The oil phase obtained in the first separation step can either include all or part of the solids of the first product mix obtained in the hydrothermal liquefaction step or all or part of the solids can be separated in the first separation step. The pressure at the thermal upgrading is typically 50-120 bar, preferably 90-110 bar and more preferably below 100 bar, including the pressure being between two of the following pressures; 50 bar, 60 bar, 70 bar, 80 bar, 90 bar, 95 bar, 100 bar, 105 bar, 110 bar and 120 bar.

The embodiments of the disclosure can be carried out batch-wise or in continuously operated reactors. The reaction time, or the residence time in case of continuously operated reactors, of the hydrothermal liquefaction step is typically 3-60 minutes, preferably 5-40 minutes, most preferably 5-30 minutes and of the thermal upgrading step is typically 5-30 minutes, preferably 5-15 minutes, not including respective heating time.

According to an embodiment of the disclosure the aqueous phase separated after the hydrothermal liquefaction step can be used in the pretreatment step as aqueous solution or is recirculated back to the hydrothermal liquefaction step to minimize the amount of fresh water and salts needed. Typically, when the aqueous phase is used as aqueous solution, the pH of the aqueous phase is kept at values higher than 5. Alternatively, more salts such as alkaline salts chosen from NaOH, $K_2CO_3$, KOH or $Na_2CO_3$ or more black liquor is added to the pretreatment step.

In an embodiment of the disclosure, the renewable product comprising oil may be subjected to a fractionation step. A gaseous fraction, if any, a light liquid fraction and a heavy liquid fraction may be obtained. Further, a bottom residue fraction typically comprising solids may be separated. The gaseous fraction typically comprises carbon dioxide, water and C1-C4 compounds. The vacuum residue of the light fraction is typically below 10%, preferably below 5%. The vacuum residue of the heavy fraction is typically above 10%. The bottom residue fraction typically comprises solids, such as char, with a molecular weight over 1000 Daltons (Da).

In embodiments of the disclosure, the second product mix or the renewable product may be used as such for example in marine fuel applications or applications relating to heating or it may be directed to a hydroprocessing step.

In further embodiments of the disclosure, the light liquid fraction, obtained by fractionation of the renewable product, may be directed to a hydroprocessing step to obtain inter alia drop-in fuels such as diesel, naphtha, and jet-fuel.

In the embodiments of the disclosure the dry biomass of the added lignocellulosic feedstock to total reaction mixture during the pretreatment is typically lower than 0.43, preferably 0.015 to 0.43, more preferably 0.1 to 0.25 by weight. Typically, the oil phase to solvent ratio in the thermal upgrading step is from 1:5 to 1.5:1 by weight.

In FIG. 1 lignocellulosic biomass 10 is fed to a pretreatment step 100 together with aqueous solution 20 of preselected salts where it is heated. The obtained mixture 30 is then fed to a hydrothermal liquefaction step 110 where it is further heated. The first product mix 40 obtained from the hydrothermal liquefaction step 110 is directed to separation step 120 where gases 51, solids 52, aqueous phase 53 and oil phase 50 are separated. Part of the aqueous phase 53 may optionally be recycled back to the pretreatment step 100 and/or to the hydrothermal liquefaction step 110. The oil phase 50, optionally together with part of the solids, is directed to a thermal upgrading step 130 together with a solvent 60. A second product mix 70 obtained from the thermal upgrading step 130 is directed to a second separation step 140 where gases 81, if any, solids 82, if any, aqueous phase 83, if any and oil phase 80 are separated. Part of the aqueous phase 83 may optionally be recycled back to the pretreatment step 100 and/or to the hydrothermal liquefaction step 110 and the oil phase 80 is directed to fractionation 200. The fractionation step 200 may be for example fractional distillation utilizing at least one fractionation distillation column. An optional gaseous fraction (not shown), a light fraction 90, a heavy fraction 91 and a bottom residue fraction 92 are separated. Optionally part of the light fraction 90 is recirculated to be used as solvent 60 in the thermal upgrading step 130. Optionally the light fraction 90 and/or the heavy fraction 91 is directed to hydroprocessing (not shown in the figure).

Figure 2:
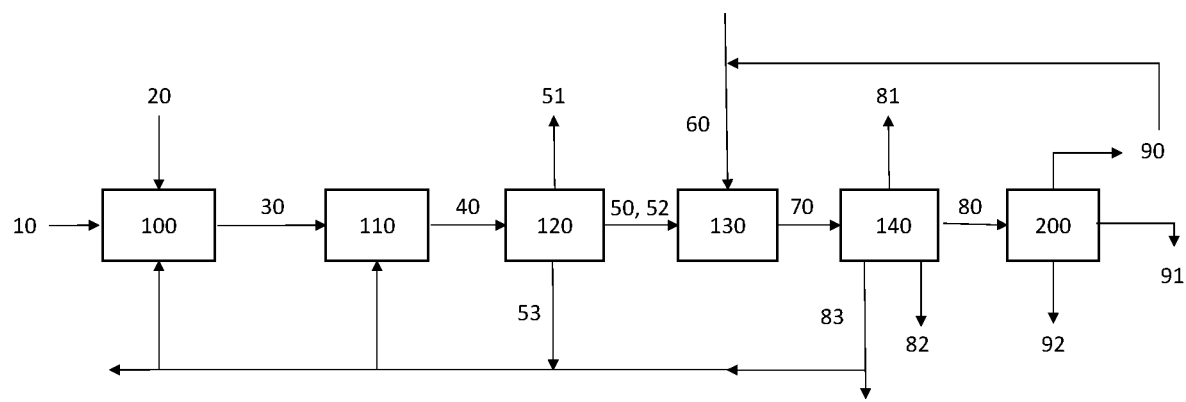
FIG. 2 is a schematic flow diagram representing a further embodiment of the multistage process.

In FIG. 2 lignocellulosic biomass 10 is fed to a pretreatment step 100 together with aqueous solution 20 of preselected salts where it is heated. The obtained mixture 30 is then fed to a hydrothermal liquefaction step 110 where it is further heated. The first product mix 40 obtained from the hydrothermal liquefaction step 110 is directed to separation step 120 where gases 51, aqueous phase 53 and oil phase 50 are separated. Part of the aqueous phase 53 may optionally be recycled back to the pretreatment step 100 and/or to the hydrothermal liquefaction step 110. The oil phase 50 comprising solids 52, is directed to a thermal upgrading step 130 together with a solvent 60. A second product mix 70 obtained from the thermal upgrading step 130 is optionally directed to a second separation step 140 where gases 81, if any, solids 82, aqueous phase 83 and oil phase 80 are separated. Part of the aqueous phase 83 may optionally be recycled back to the pretreatment step 100 and/or to the hydrothermal liquefaction step 110 and the oil phase 80 is directed to fractionation 200. The fractionation step 200 may be for example fractional distillation utilizing at least one fractionation distillation column. An optional gaseous fraction (not shown), a light fraction 90, a heavy fraction 91 and a bottom residue fraction 92 are separated. Optionally part of the light fraction 90 is recirculated to be used as solvent 60 in the thermal upgrading step 130. Optionally the light fraction 90 and/or the heavy fraction 91 is directed to hydroprocessing (not shown in the figure).

Figure 3:
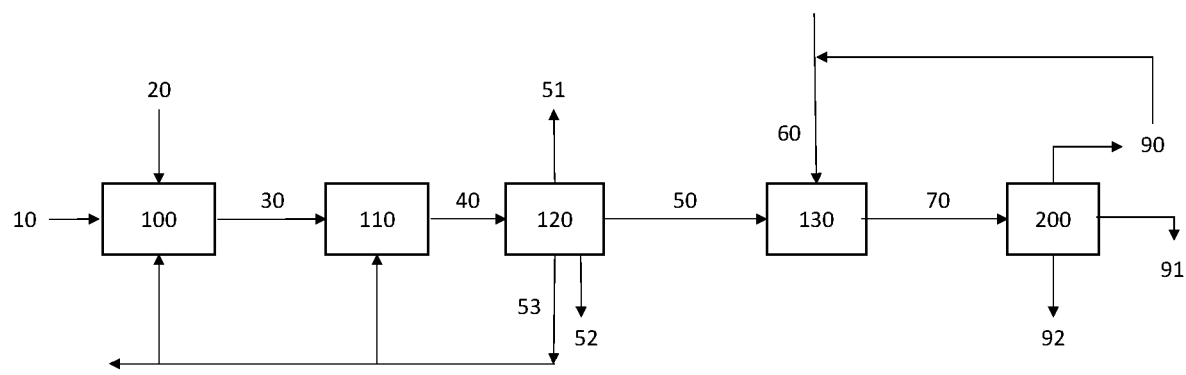
FIG. 3 is a schematic flow diagram representing a further embodiment of the multistage process.

In FIG. 3 lignocellulosic biomass 10 is fed to a pretreatment step 100 together with aqueous solution 20 of preselected salts where it is heated. The obtained mixture 30 is then fed to a hydrothermal liquefaction step 110 where it is further heated. The first product mix 40 obtained from the hydrothermal liquefaction step 110 is directed to separation step 120 where gases 51, solids 52, aqueous phase 53 and oil phase 50 are separated. Part of the aqueous phase 53 may optionally be recycled back to the pretreatment step 100 and/or to the hydrothermal liquefaction step 110 and the oil phase 50 is directed to a thermal upgrading step 130 together with a solvent 60. A second product mix 70 obtained from the thermal upgrading step 130 is directed to fractionation 200. The fractionation step 200 may be for example fractional distillation utilizing at least one fractionation distillation column. An optional gaseous fraction (not shown), a light fraction 90, a heavy fraction 91 and a bottom residue fraction 92 are separated. Optionally part of the light fraction 90 is recirculated to be used as solvent 60 in the thermal upgrading step 130. Optionally the light fraction 90 and/or the heavy fraction 91 is directed to hydroprocessing (not shown in the figure).

Lignocellulosic Feedstock

The lignocellulosic feedstock is preferably selected from non-edible resources such as non-edible wastes and non-edible plant materials. A preferred lignocellulosic biomass material according to the present invention comprises or is chosen from energy crops, for example *Brassica carinata*; waste or residues of the wood-processing industry such as slash, urban wood waste, lumber waste, wood chips, wood branches, bark, leaves, needles, tree tops, wood sawdust, straw, cutter shavings, firewood, plywood residual; residues of the pulp- and papermaking such as recycled paper, black liquor, brown liquor and sludges; and/or residues of timber processes. Typically, lignocellulosic biomass contains up to 50 wt. % of water. Typically, solid lignocellulosic feedstock as used in the disclosure, is broken down or split to a maximum size of less than 100 mm, preferably from 0.5 to 50 mm, more preferably from 0.5 to 30 mm, most preferably from 0.5 to 15 mm by grinding, chopping, cutting, crushing etc. Typical, preferred feedstock is energy crop and waste or residues of the wood-processing industry, more preferably seeds of the family Brassicaceae, for example *Brassica carinata*, wood chips, bark, especially bark in the size of wood chips and/or sawdust. A typical softwood chip used for chemical pulping is 25±3 mm long and 4 mm thick. In mechanical pulping, the chips are 20±2 mm long and 3 mm thick on average. Hardwood chips are 20±2 mm long and 3 mm thick on average. A typical bark size is 0.25 to 100 mm, preferably from 3 to 50 mm, more preferably from 16 to 45 mm. A typical sawdust is below 5 mm, preferably below 3.15 mm, more preferably below 2 mm, most preferably below 1 mm.

Optional Fractionation of the Second Product Mix or the Renewable Product

The obtained second product mix or the renewable product may optionally be fractionated in a fractionation step. A gaseous fraction, if any, a light fraction and a heavy fraction as well as a bottom residue fraction comprising solids, if any, may be obtained. The fractionation may be carried out after drying of the renewable product.

The gaseous fraction typically comprises water and light gaseous (C1-C4) compounds.

The vacuum residue of the light fraction is typically below 10 wt. %, preferably below 5 wt. %.

The vacuum residue of the heavy fraction is typically above 10 wt. %. The heavy fraction may be directed to hydrocracking, energy production, etc.

In an embodiment, the second product mix or the renewable product may be directed to a hydroprocessing step without fractionation.

In another embodiment, the light fraction, obtained by fractionation of said second product mix or said renewable product, may be directed to a hydroprocessing step.

The fractionation may be carried out as evaporation, distillation, extraction or as a combination of any of these.

Fractions comprising the gaseous fraction, the light liquid fraction and the heavy liquid fraction can be separated. A person skilled in the art is able to vary the fractionation/distilling conditions and to change the temperature cut point as desired to obtain any desired fraction, boiling in the predetermined ranges.

Alternatively, a combination of different methods may also be used.

Optional Hydroprocessing Step

In the embodiments of the disclosure, the second product mix, the recovered renewable product comprising oil or the light fraction may be subjected to a catalytic hydroprocessing step carried out in the presence of hydrogen, to yield an effluent, which may be subjected to a second fractionation and/or further processing steps for providing liquid fuels and other chemicals. Gasoline fractions that can be used as a bio-naphtha component or as raw material for bio-plastics may also be produced.

The hydroprocessing step may be carried out for effecting at least one of hydrodeoxygenation, hydrodewaxing, hydroisomerization, hydrocracking, hydrodearomatization and ring opening reactions.

In an embodiment, the renewable product, or a light liquid fraction obtained by fractionation of the renewable product, may be subjected to a catalytic hydroprocessing step carried out in the presence of hydrogen, to yield an effluent. Said effluent may be subjected to fractionation and/or further processing steps for providing liquid fuels and other chemicals.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina (Al2O3), gamma-alumina, zeolite-alumina, alumina-silica (SiO2), ZrO2, alumina-silica-zeolite and activated carbon. Suitably a mixture of CoO and MoO3 (CoMo) and/or a mixture of NiO and MoO3 (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, suitably from 30 to 120 bar.

In an embodiment, hydrogen partial pressure is maintained in the range from 50 to 250 bar, suitably from 80 to 200 bar, particularly suitably from 80 to 110 bar.

The hydroprocessing is carried out at a temperature in the range of 100 to 450° C., suitably 280° C. to 450° C., more suitably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is suitably in the range of 0.1-5 and preferably in the range of 0.3-0.7.

The ratio of H2/feed varies between 600 and 4000 Nl/l, suitably of 1300-2200 Nl/l.

The feed is pumped to the hydroprocessing reactor at a desired speed. Suitably the feed rate LHSV (liquid hourly space velocity) of the feed material is in the range of 0.01-10 h−1, suitably 0.1-5 h−1.

The hydroprocessing step may be carried out as at least one-step process or as at least two-step process.

The liquid hydrocarbon stream obtained from the hydroprocessing includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

EXAMPLES

The pinewood composition used in the examples is shown in Table 1 and the black liquor used in the examples is shown in Table 2.

TABLE 1

| Pinewood (sawdust) composition Pine wood | |
|---|---|
| Wood chips (wt. %) | |
| $d_p$ < 50 mm | 100 |
| Sawdust, sieve fraction (wt. %) | |
| 500 > $d_p$ > 250 μm | 61.6 |
| 250 > $d_p$ > 150 μm | 13.7 |
| 150 > $d_p$ > 53 μm | 16.9 |
| $d_p$ < 50 μm | 7.7 |
| Moisture content of wood chips (wt. %) | 12 |
| Moisture content of sieved fraction (wt. %) | 3.6 |
| Fixed carbon (wt. %) | 24.1 |
| Volatiles (wt. %) | 72.8 |
| Elemental composition (wt. %) | |
| C | 48.3 |
| H | 6.4 |
| N | 0.1 |
| O* | 45.2 |
| AAEM (ppm) | |
| Na | 30 |
| K | 370 |
| Mg | 160 |
| Ca | 2225 |
| Si | 200 |
| Fe | 40 |
| Al | 20 |
| Zn | 20 |
| Sum (AAEM) | 3065 |
| Total ash (520° C.) pine wood, (wt. %) | 0.30 |
| Total ash (815° C.) pine wood, (wt. %) | 0.21 |

*Oxygen by difference

TABLE 2

| Black liquor composition | | | |
|---|---|---|---|
| wt. % | Water | organics | inorganics |
| Black liquor | 60 | 13.9 | 26.1 |

For the black liquor composition water was determined by Karl Fischer titration, inorganics were measured by ashing and organics were calculated by 100−water %-ash %. Dry Black Liquor includes organics and inorganics.

Analysis Methods Used in the Examples

Gas samples were analysed with an off-line Varian rapid gas chromatograph RGA-450GC with two analytical columns (10 m Molsieve 5A and 10 m PPQ), and with an off-line Agilent 7890A gas chromatograph equipped with three analytical columns and three different detectors (0.9 m Supelco 12255 U column and TCD detector for the quantification of CO2 and H2S, 10 m DB1 column and FID detector for the quantification of light hydrocarbons and, 10 m Moisieve 5A column and TCD detector for the quantification of O2, H2, N2 and CO), using helium as carrier gas in all cases.

The molecular weight distribution of the oil phase was determined with a Gel Permeation Chromatograph (GPC) of the Agilent 1200 series, applying IR and UV light (wavelength 254 nm) and 3 GPC PLgel 3 lm MIXED-E columns placed in series. The columns were operated at 40° C. and tetrahydrofuran (THF) was used as a solvent. Calibration was performed with a solution of polystyrene with molecular weights ranging from 162 to 30230 Da.

The elemental composition of the liquid and solids was determined with an Interscience Flash 2000 elemental analyser. The water content of the aqueous phase was determined by Karl Fischer titrations using Hydranal composite 5, Metrohm 787 KFTitrino as titrant. The pH of the aqueous phase, obtained after the experiments, was measured with a Metrohm 785 DMP titrino apparatus.

The contents of ash, volatile matter, moisture and fixed carbon in the pinewood (proximate analysis) were determined by measuring weight loss upon heating. These constituents will add up to 100%. Ash content determination was performed by heating a pinewood sample in air at a slow heating rate (5° C./min). Once the temperature reached 520 or 815° C. it was kept constant for 6 hours before the sample was weighted. The remaining weights measured at 520 and 815° C. represent the ash contents at these temperatures.

The combined content of fixed carbon and volatiles was determined by slowly heating a pinewood sample (5° C./min) in nitrogen to 950° C. where it was maintained for 10 minutes before it was weighted. The measured weight loss represents the combined content of water and volatiles. The remaining weight represents the content of fixed carbon.

The moisture content of the pinewood was determined by a PMB-53 moisture analyzer of Adam Equipment.

Calculations of Mass Balance and Yields

The mass balance distinguishes four different product phases—oil (o), aqueous phase (aq), gas (g) and solids (s). The produced amounts of each phase are determined as follows:

1. Oil—The amount of organics remaining in the recovered oily phase and corrected by subtracting the known water content in the oil obtained by Karl Fischer titration
2. Aqueous phase organics (water soluble organics—WSO)—Based on measured water content of the ingoing (the recycle) and outgoing aqueous phase using Karl Fischer titration (the concentration of organics is determined by difference (100-wt. % water) and the black liquor fed (assuming that the organics in BL are WSO). The yield of WSO was determined by: (gram_WSO_in_aqu_out-gram_WSO_in_aqua_in)/gram_wood/bark_in. WSO_in contains the recycle WSO and the organics in black liquor.
3. Gas—From the known volume of produced gas and GC composition, the weight of total gas is calculated and the amount of measured N2 is subtracted. In case K2CO3 is used as a salt, the possible contribution of formed CO2 to the amount of gas is neglected. In case of experiments with black liquor, the known volume of produced gas and the average molar weight of 33 g/mol are used to estimate the amount of gas produced. Nitrogen is subtracted based on the initial pressure and the approximate initial volume taken up by gas phase in the reactor at the start of an experiment.
4. Solids (char)—The amount of solids is determined directly by weighing dried solids when withdrawn from the oven.

Since all yields are given on dry biomass basis, the amount of dry biomass fed in the autoclave is corrected for initial wood moisture as follows:

$$m_{biomass,dry} = m_{biomass} \cdot (1 - w_{moisture,biomass}) \qquad (Eq. 1)$$

The yields are calculated by:

$$Y_{product} = \frac{m_{product}}{m_{biomass,dry}} \qquad (Eq.2)$$

$Y_O$ is used for the oil yield, $Y_{AQ}$ for the aqueous phase organics, $Y_S$ for the solids and $Y_G$ for the gas. Subsequently, the balance closure is expressed as the sum of all four product yields.

For tests with black liquor, biomass in the denominator includes the organics in black liquor.

Vacuum Residue and Average Molecular Weight

Both vacuum residue (VR) and average molecular weight ($M_w$) are excerpted from GPC analysis. The parameters are based on the results from the refractive index detector (RID) of the GPC analyser. Molecular weight is taken directly from the GPC output file, whereas vacuum residue is calculated as follows:

$$VR = \frac{\text{Area of molecules heavier than 1000 Da}}{\text{Total area}} \qquad (Eq.3)$$

The areas are calculated using numerical integration (trapezoidal method).

$$\text{Area} = \int_{\log M_{w,1}}^{\log M_{w,2}} RID \, d(\log M_w) \qquad (Eq.4)$$

Oxygen Content

With the applied recovery procedure, a small fraction of water always remained in the oil phase. Therefore, the oxygen content is corrected for the oxygen in water. The water content of the oil sample ($KFT_{oil}$ in wt. %) is known from Karl Fischer titration and therefore the obtained oxygen content including that of water ($O_{wet}$) can be corrected to obtain the oxygen content of the oil on dry basis (O):

$$O = \frac{O_{wet} - \frac{16}{18} \cdot KFT_{oil}}{\left(1 - \frac{KFT_{oil}}{100}\right)} \qquad (Eq.5)$$

The same procedure holds for the hydrogen content in the oil:

$$H = \frac{H_{wet} - \frac{2}{18} \cdot KFT_{oil}}{\left(1 - \frac{KFT_{oil}}{100}\right)} \qquad (Eq.6)$$

Example 1. Pretreatment of Feedstock Using NaOH

A mixture containing 10 wt. % of wood chips and 1.2 wt. % NaOH (12 wt. % on wood chips intake) in water was made. The characterization results of wood are shown in Table 1.

This mixture was heated to 210° C. for 1 h and stirred at 1000 rpm. The pretreatment was performed in a 5-liter batch reactor. The stirrer was used for particle size reduction. Without stirring (mechanical energy) less size reduction of the wood chips occurred. NaOH concentrations higher than 25 wt. % (on wood chips intake) led to a homogeneous slurry containing very fine (micron) particles.

The mixture obtained by the treatment was a pumpable mixture. The yield of the process was 100%.

Example 2. Pretreatment of Feedstock Using Black Liquor

A mix containing 15 wt. % of bark in black liquor and water was made. A ratio of 17:27 of dry black liquor to dry biomass was used. The rest of the feed was water. The mix was heated to 210° C. and stirred at 1000 rpm. The heating was continued for 1 h and the pressure was 24 bar.

The mixture obtained by the treatment was a pumpable mixture. The yield of the process was 95 wt. % and the gas yield 5 wt. %. The pH of the aqueous phase was 8.75.

Comparative Example 1. Hydrothermal Liquefaction at 400° C.

The wood slurry obtained after pretreatment according to Example 1, using 1.2 wt. % NaOH, was filtered until the slurry had a concentration of 25 wt. % wood. After filtration the substance has the appearance of a paste. The obtained pretreated paste was used as a feedstock for hydrothermal liquefaction, HTL (in a single stage) at 400° C. for 10 minutes (at set-point). The experiment was performed in a 45 ml autoclave. An additional 0.5 wt. % of NaOH (2 wt. % on biomass intake) was added to the paste prior to HTL. The HTL results are shown in Table 3. The oil yield was 37.1 wt. %. The solid yield was 23.9 wt. %. The aqueous yield and gas yield were relatively low, only 14.6 and 10.3 wt. %, respectively.

TABLE 3

HTL of pretreated paste (25 wt. % biomass) at 400° C. for 10 minutes.

| | Oil yield [wt. %, dry] | Solid yield [wt. %, dry] | Gas yield [wt. %, dry] | Aqueous phase [wt. %, dry] | Oxygen [wt. %, dry] | Mw g/mol | VR % |
|---|---|---|---|---|---|---|---|
| 1 stage HTL | 37.1 | 23.9 | 10.3 | 14.6 | 17.5 | 607 | 17.6 |

Example 3. Hydrothermal Liquefaction Step at 300° C.

Wood (15 wt. %) together with 0.75 wt. % NaOH (5 wt. % on wood intake) and 84.25 wt. % water was treated in the HTL step ($1^{st}$ stage). The reactor temperature was 300° C. and the reaction time 20 minutes (at set-point). The product yields and oil composition are presented in Table 4. The pressure was maximally 100 bar. A high oil yield of 39.9 wt. % was obtained. The solids yield was only 9.0 wt. %. The oxygen content was 19.7 wt. %. Part of the aqueous fraction can be recycled to the pretreatment as it contains most of the NaOH.

TABLE 4

Characteristics of first product mix obtained from the hydrothermal liquefaction step

| | Oil yield [wt. %, dry] | Solid yield [wt. %, dry] | Gas yield [wt. %, dry] | Aqueous phase [wt. %, dry] | Oxygen [wt. %, dry] | Mw g/mol | VR % |
|---|---|---|---|---|---|---|---|
| HTL oil ($1^{st}$ stage) | 39.9 | 9.0 | 6.3 | 30.5 | 19.7 | 752 | 19 |

Example 4. Thermal Upgrading Step

The HTL ($1^{st}$ stage) oil, obtained following example 3, was processed using a distillation cut obtained in hydrothermal liquefaction as solvent. The product yields are listed in Table 5. In this table also the composition of the feed oil ($1^{st}$ stage) is shown.

When processing $1^{st}$ stage oil in a distillation cut a high oil yield of 92% was obtained and the gas and char yields were low. It must be noted however, that this oil originates from the distillate cut and the HTL ($1^{st}$ stage) oil together and that only processing the distillate cut resulted in even higher oil yields. This means that the oil yield from the added HTL ($1^{st}$ stage) oil is lower than the total yield. Only by mass balance calculation the oil produced from the HTL ($1^{st}$ stage) oil can be known. An oil yield of 89 was calculated, see the value between brackets in Table 5.

After thermal upgrading in the distillation cut no separate aqueous phase was found. However, the reported oil yields could include some water. The oxygen content of the oil obtained after thermal upgrading ($2^{nd}$ stage) was 9.7 wt. % and the vacuum residue only 4%.

TABLE 5

Characteristics of second product mix obtained from the thermal upgrading step

| | Oil yield [wt. %] | Solid yield [wt. %, dry] | Gas yield [wt. %, dry] | Oxygen [wt. %, dry] | Mw g/mol | VR % |
|---|---|---|---|---|---|---|
| HTL ($1^{st}$ stage) oil | — | — | — | 19.7 | 752 | 19 |
| HTL ($1^{st}$ stage) oil + Thermal upgrading of distillation cut | 92 | 0 | 3.4 | 9.7 | 229 | 4 |

For comparison, the distillation cut was also subjected to thermal upgrading conditions and this result is shown in Table 6.

The vacuum residue of the distillation cut used as solvent at the operation conditions of the second thermal upgrading is only 3% as can be seen from the results presented in Table 6.

TABLE 6

Characteristics of the distillation cut used as solvent

| | Oil yield [wt. %] | Solid yield [wt. %, dry] | Gas yield [wt. %, dry] | Oxygen [wt. %, dry] | Mw g/mol | VR % |
|---|---|---|---|---|---|---|
| Distillation cut | — | — | — | 14.3 | 131 | 0 |
| Thermal upgrading of distillation cut | 96 | 0 | 3.1 | 13.3 | 414 | 3 |

The oil product from this step is fractionated and the light fraction is used as solvent for the second step thermal upgrading. The light fraction can also be hydrotreated or the product from the thermal upgrading step can be hydrotreated as such without fractionation.

Example 5. Hydrothermal Liquefaction Step Using Black Liquor

Six experiments were performed to produce enough HTL oil ($1^{st}$ stage) for example 6. The Black liquor concentration was 10 wt. % and the concentration of wood chips was 15 wt. %. The rest of the feed was added water. The average yields and oil composition of these 6 experiments can be found in Table 7. The temperature was kept at 300° C. for 20 minutes (at set-point). The pressure range of these 6 experiments was between 90-110 bar.

TABLE 7

Product yields for first product mix using black liquor

| | Oil yield [wt. %, dry] | Solid yield [wt. %, dry] | Gas yield [wt. %, dry] | Aqueous phase [wt. %, dry] | Oxygen [wt. %, dry] | Mw g/mol | VR % |
|---|---|---|---|---|---|---|---|
| HTL oil (1st stage) | 38 | 9.5 | 10.8 | 21.4 | 19.7 | 752 | 32 |

Example 6. Thermal Upgrading Step Derived from the Product from First Step Using Black Liquor The oil from Example 5 was thermally upgraded at 380° C. for 10 minutes (at set-point). The maximum pressure during the experiment was 90 bar. The product yields and oil composition are shown in Table 8. The Table includes the composition of the oil obtained from Example 5. It can be observed that the oil yield, obtained after thermal upgrading of the HTL (1st stage) oil together with the distillate cut, is 96 wt. %. Between brackets the calculated oil yield obtained only from thermal upgrading of the HTL (1st stage) oil.

TABLE 8

Characteristics of second product mix obtained from the thermal upgrading step using black liquor

| | Oil yield [wt. %] | Solid yield [wt. %, dry] | Gas yield [wt. %, dry] | Oxygen [wt. %, dry] | Mw g/mol | VR % |
|---|---|---|---|---|---|---|
| HTL (1st stage) oil | — | — | — | 19.7 | | 32 |
| HTL (1st stage) oil + Thermal upgrading of distillation cut | 96 | <1 | 1.3 | 13.8 | 279 | 6.8 |

For comparison, the distillation cut was also subjected to Thermal Upgrading conditions and this result is shown in Table 9.

TABLE 9

Characteristics of the distillation cut used as solvent

| | Oil yield [wt. %] | Solid yield [wt. %, dry] | Gas yield [wt. %, dry] | Oxygen [wt. %, dry] | Mw g/mol | VR % |
|---|---|---|---|---|---|---|
| Distillation cut | — | — | — | 11.8 | | 2 |
| Thermal upgrading of distillation cut | 92 | <1 | 1.8 | 9.3 | 276 | 3 |

The oil product from this step is fractionated and the light fraction is used as solvent for the second step thermal upgrading. The light fraction can also be hydrotreated or the product from the thermal upgrading stage can be hydrotreated as such without fractionation.

Example 7. Hydrothermal Liquefaction Step Using Black Liquor

Pretreated feedstock, obtained following Example 2, was processed at a temperature kept at 300° C. for 20 minutes (at set-point). The pressure was 84 bar. The yields and oil composition can be found in Table 10. The results were compared to the yields of the 1st stage HTL oil from hydrothermal liquefaction step without pretreatment obtained following Example 8.

TABLE 10

Product yields for first product mix using black liquor

| | Oil yield [wt. %, dry] | Solid yield [wt. %, dry] | Gas yield [wt. %, dry] | Oxygen [wt. %, dry] |
|---|---|---|---|---|
| HTL oil (1st stage) (with pretreatment) | 40 | 27 | 12 | 32 |
| HTL oil (1st stage) (without pretreatment) | 30 | 35 | 16 | 28 |

Example 8. Thermal Upgrading Step Derived from the Product from First Step Using Black Liquor HTL oil (1st stage) was made by mixing 15 wt. % of bark in black liquor and water. A ratio of 17:27 of dry black liquor to dry biomass. The rest of the feed was water. The temperature was kept at 300° C. for 20 minutes (at set-point). The pressure was 84 bar. The average yields and oil composition can be found in Table 11.

TABLE 11

Product yields for first product mix using black liquor

| | Oil yield [wt. %, dry] | Solid yield [wt. %, dry] | Gas yield [wt. %, dry] | Oxygen [wt. %, dry] |
|---|---|---|---|---|
| HTL oil (1st stage) | 30 | 35 | 16 | 28 |

3.0 gram of this 1st stage oil was thermally upgraded at 380° C. for 10 minutes (at set-point) with 17 grams of solvent. The maximum pressure during the experiment was 105 bar. Light fraction from hydrothermal liquefaction at 400° C., using black liquor and sawdust and distillated at 180° C. and 30 mbar, was used as solvent. The product yields and oil composition are shown in Table 12.

TABLE 12

Characteristics of second product mix obtained from the thermal upgrading step using black liquor

| | Oil yield [wt. %] | Solid yield [wt. %, dry] | Gas yield [wt. %, dry] | Oxygen [wt. %, dry] |
|---|---|---|---|---|
| HTL (2nd stage) oil | 97* | 1.3 | 1.8 | 10 |

*based on 1st stage crude and lights oil

The oil product from this step is fractionated and the light fraction is used as solvent for the second step thermal upgrading. The light fraction can also be hydrotreated or the product from the thermal upgrading stage can be hydrotreated as such without fractionation.

The examples presented above were performed in a batch reactor. However, the set-up can also be continuous as presented in FIG. 1-3.

The invention claimed is:

1. A process for converting lignocellulosic feedstock (10) to renewable product (80), characterized in that the process comprises the following steps, (a) treating (100) lignocellulosic feedstock (10) with aqueous solution (20), at a temperature between 180° C. and 245° C., under a pressure from 10 to 55 bar, for 10-180 min to obtain a mixture (30);

(b) heating (110) the mixture (30) of step (a) at a temperature between 290 and 340° C., under a pressure from 70 to 160 bar, to obtain a first product mix (40);

(c) separating (120) aqueous phase (53) and oil phase (50), and optionally gas (51) and/or solids (52), of the first product mix (40) of step (b); and (d) heating (130) the oil phase (50) of step (c) and solvent (60) at a temperature between 360° C. to 450° C., under a pressure from 50 to 120 bar.

2. The process according to claim 1, characterized in that the aqueous solution (20) in step (a) is black liquor, black liquor and water or water and alkaline salts.

3. The process according to claim 1, characterized in that a ratio of dry biomass to total reaction mixture is lower than 0.43 by weight.

4. The process according to claim 1, characterized in that said solvent (60) in the third step is crude tall oil, acid oil, vegetable oil, renewable hydrocarbons, oxygen containing hydrocarbons or mixtures thereof.

5. The process according to claim 1, characterized in that the oil phase to solvent ratio is from 1:5 to 1.5:1 by weight.

6. The process according to claim 1, characterized in that aqueous phase (53) of step (c) is used in step (a) (100) as aqueous solution (20) or is recirculated back to step (b) (110).

7. The process according to claim 1, characterized in that lignocellulosic feedstock (10) is energy crops, waste or residues of wood-processing, raw-material or residues of pulp and papermaking, and/or residues of timber processes.

8. The process according to claim 1, characterized in that step (d) (130) is followed by a step (e) (140) comprising separating aqueous phase (83), oil phase (80) and optionally gas (81) and/or solids (82) of the second product mix (70) of step (d) (130).

9. The process according to claim 8, characterized in that aqueous phase (83) of step (e) (140) is used in step (a) (100) as aqueous solution (20) and/or is recirculated back to step (b) (110).

10. The process according to claim 1, characterized in that step (d) (130) is followed by fractionation (200) to obtain a light fraction (90) and a heavy fraction (91) and optionally a bottom residue fraction (92) and/or a gaseous fraction.

11. The process according to claim 10, characterized in that the light fraction (90) from said fractionation (200), or part of it, is directed to a hydroprocessing step.

12. The process according to claim 10, characterized in that the light fraction (90), or part of it, is recycled to step (d) (130) as solvent (60).

13. The process according to claim 1, characterized in that the treating of the lignocellulosic feedstock (10) with aqueous solution (20) in step (a) (100) is performed at a temperature from 200° C. to 220° C. and/or a pressure from 10 bar-20 bar for 10-80 minutes.

14. The process according to claim 1, characterized in that heating the mixture (30) of step (a) (100) is performed at a temperature from 300° C. and 330° C., and/or at a pressure from 100 bar to 115 bar.

15. The process according to claim 1, characterized in that the heating the oil phase (50) of step (c) (120) is performed at a temperature from 370° C. and 400° C. and/or at a pressure from 90-110 bar.

16. The process according to claim 1, characterized in that the heating of step (b) (110) is performed for 3-60 minutes and/or of step (d) (130) is performed for 5-30 minutes.

17. The process according to claim 1, characterized in that heat from one or more product streams is used to heat up feed streams.

18. The process according to claim 2, wherein the alkaline salts are chosen from one or more of NaOH, $K_2CO_3$, KOH, and $Na_2CO_3$.

19. The process according to claim 3, wherein the ratio of dry biomass to total reaction mixture is 0.015 to 0.43.

20. The process according to claim 3, wherein the ratio of dry biomass to total reaction mixture is 0.1 to 0.25.

21. The process according to claim 1, wherein the lignocellulosic feedstock is seeds and/or residues of wood processing.

22. The process according to claim 1, wherein the lignocellulosic feedstock is seed crop, urban wood waste, lumber waste, wood chips, wood branches, bark, wood sawdust, straw, firewood and/or plywood residual.

23. The process according to claim 1, wherein the lignocellulosic feedstock is *Brassica carinata* seed, wood chips, bark and/or sawdust.

24. The process according to claim 1, characterized in that the treating of the lignocellulosic feedstock (10) with aqueous solution (20) in step (a) (100) is performed at a temperature from 200° C. to 220° C. and/or a pressure from 10 bar-20 bar for 50-70 minutes.

25. The process according to claim 15, wherein the pressure is from 90 to below 100 bar.

* * * * *